Jan. 1, 1924
F. DIAZ
VEHICLE SIGNAL
Filed March 9, 1923
1,479,588
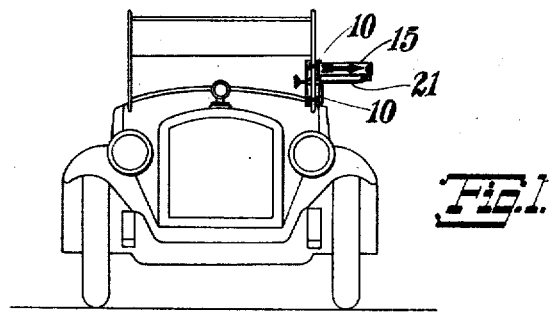
Fig. 1.
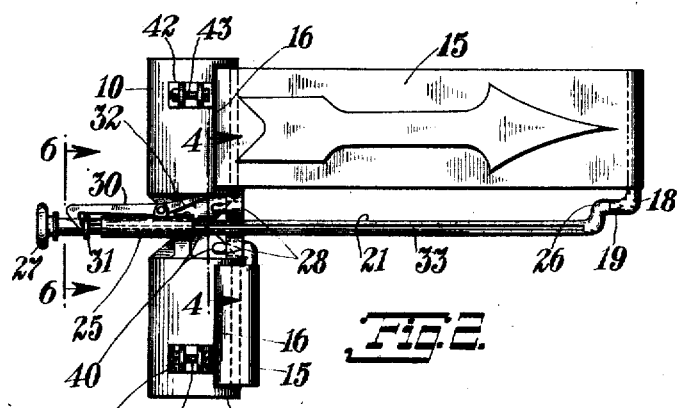
Fig. 2.
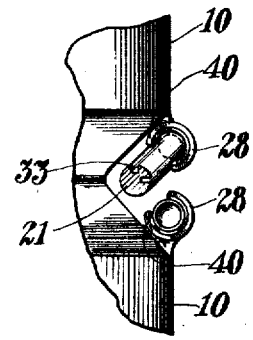
Fig. 4.
Fig. 3.
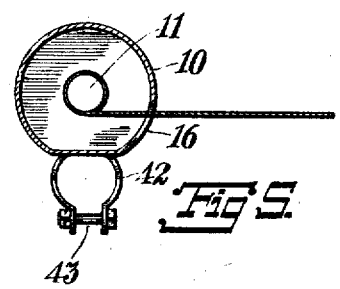
Fig. 5.
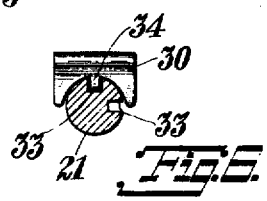
Fig. 6.
Inventor
Francisco Diaz,
By
Attorney Patented Jan. 1, 1924.

1,479,588

UNITED STATES PATENT OFFICE.

FRANCISCO DIAZ, OF WINSLOW, ARIZONA.

VEHICLE SIGNAL.

Application filed March 9, 1923. Serial No. 623,883.

*To all whom it may concern:*

Be it known that FRANCISCO DIAZ, a citizen of Mexico, residing at Winslow, in the county of Navajo and State of Arizona, have invented certain new and useful Improvements in Vehicle Signals, of which the following is a specification.

This invention relates to vehicle signal devices adapted for application to automobiles, motor trucks or vehicles generally, to give notice to the drivers of adjacent vehicles or to pedestrians, of an intention to turn in either direction, or that the vehicle has come to or is coming to a stop.

The invention has for an object to provide a novel and simple vehicle signal of this sort which can be readily operated by the driver, and which can be easily mounted on any ordinary automobile or truck without the use of special tools, or the need of making any changes in the structure thereof.

For further comprehension of the invention, and of the objects and advantages thereof, reference will be had to the following description and accompanying drawings, and to the appended claims in which the various novel features of the invention are more particularly set forth.

Fig. 1 of the drawings is a front view of an automobile having my improved signal device mounted thereon.

Fig. 2 is a rear elevation of the device alone.

Fig. 3 is a vertical sectional view of one of the compartments, which normally contain the signal strips indicating the latter in elevation, and projected to operative position.

Fig. 4 is a fragmentary vertical section on the line 4—4 of Fig. 1.

Fig. 5 is a horizontal sectional view taken on the line 5—5 of Fig. 3.

Fig. 6 is a detail transverse vertical section on the line 6—6 of Fig. 2.

As here embodied my improved signal device comprises a pair of axially alined casing elements 10 of substantially circular cross section, and which are rigidly connected together to form one unit. In these casings are mounted rotatable drums such as 11 to which are connected the clock springs such as 12 whereby the signal members proper are wound upon the drums.

The signal elements proper are in the form of strips 15 of cloth or the like and which are attached at one end to the drums 11 and extend outwardly through vertical slots 16 in the casing elements 10. Secured by stitching or otherwise to the free ends of these strips are vertical rods 18 which project at adjacent ends therefrom. The adjacent ends of these rods are turned backward as at 19 and are formed with sockets such as 20 to receive the diminished end of a slidable bar 21 whereby the strips 15 are projected from the casing.

This bar is slidably carried in a sleeve 25 fixed on the casing, and the end 26 thereof which is adapted to engage the sockets is offset laterally from the main length of the bar although extending parallel thereto. Upon the opposite end of the bar is fixed a push button 27. Mounted on the casing in such position as to permit of the end of bar 25 being brought into registry with both thereof by rotary movement of said bar, are arcuate spring clips 28 having their outer ends flared as shown.

To retain the bar 25 in position with the selected signal strip exposed I provide a latch 30 which is hinged on the sleeve and has a forked hook on one end adapted to engage a flange 31 on the bar, the latch being urged to operative position by a spring 32. Formed in the bar are two longitudinal grooves 33 into either of which may project a lug 34 on the hooked end of the latch 30 whereby the bar is held against rotary movement, the grooves 33 being so arcuately spaced that the end 26 of the bar will be in position to engage the end of either rod 18 according to which groove the lug 34 is engaging.

Each of the strips 15 has the word "Stop" painted on one side thereof and an arrow on the opposite side, the arrows on the respective strips pointing in opposite directions.

Under normal conditions the strips are concealed in the casing elements 10, being wound on the drums 11, while the bar 20 has its end 26 adjacent the sleeve 25 and in alinement with the rod end 19 of one of the said strips. When it is desired to signal other vehicles the bar 20 is simply pushed outward, unwinding the proper signal strip from its drum and exposing it to view, the flange 31 on the bar riding under the end of latch 30, which automatically drops into place behind said flange and holds the parts extended. When the signal is to be withdrawn the latch is released and the spring 12 returns the parts to their former position. As the end of the strip comes adjacent the casing, the back-turned end of the rod 18 engages in the clip 28 so as to be in position to be again engaged by the bar end 26. The clips are preferably formed on one side with extended tongues 40 which act as a stop for said bar end when the latter has been swung to proper registering position with the socket 20.

The device may be mounted on one of the side posts of the windshield of the automobile or truck and to this end the casing is provided with clips 42 adapted to be sprung over said post and be clamped thereon by bolts 43.

Having thus described my invention what I claim as new and desire to protect by Letters Patent of the United States is as follows:

1. A vehicle signal comprising a casing, a pair of flexible signal strips adapted to be wound into rolls in said casing or projected therefrom, a slidable bar on said casing, and devices carried by said signal strips adapted to be selectively engaged by said bar to project the desired strip from the said casing, said bar remaining in slidable engagement with the casing while being engaged with the said devices.

2. A vehicle signal comprising a casing, a pair of flexible signal strips adapted to be wound into rolls in said casing or projected therefrom, a slidable bar on said casing, and devices carried by said signal strips adapted to be selectively engaged by said bar to project the desired strip from the said casing, said bar being mounted for rotary movement also on said casing and having the end thereof which engages the said devices laterally offset whereby the bar may be swung to position to engage either of said devices.

3. A vehicle signal comprising a casing, a pair of flexible signal strips adapted to be wound into rolls in said casing or projected therefrom, a slidable bar on said casing, and devices carried by said signal strips adapted to be selectively engaged by said bar to project the desired strip from the said casing, said bar being mounted for rotary movement also on said casing and having the end thereof which engages the said devices laterally offset whereby the bar may be swung to position to engage either of said devices, said devices comprising rods attached to the free ends of the said strips and having back-turned socketed ends adapted to be engaged by the said end of the bar.

4. A vehicle signal comprising a casing, a pair of flexible signal strips adapted to be wound into rolls in said casing or projected therefrom, a slidable bar on said casing, and devices carried by said signal strips adapted to be selectively engaged by said bar to project the desired strip from the said casing, said bar being mounted for rotary movement also on said casing and having the end thereof which engages the said devices laterally offset whereby the bar may be swung to position to engage either of said devices, said devices comprising rods attached to the free ends of the said strips and having back-turned socketed ends adapted to be engaged by the said end of the bar, and a member adapted to engage said bar and hold it against rotation in the desired position.

In testimony whereof I have affixed my signature.

FRANCISCO DIAZ.